US011580008B2

(12) United States Patent
Spiro et al.

(10) Patent No.: US 11,580,008 B2
(45) Date of Patent: Feb. 14, 2023

(54) METHOD AND SYSTEM FOR SYNCHRONOUS DEVELOPMENT AND TESTING OF LIVE, MULTI-TENANT MICROSERVICES BASED SAAS SYSTEMS

(71) Applicant: OpenGov, Inc., Redwood City, CA (US)

(72) Inventors: Jono Spiro, Alameda, CA (US); Pushkala Pattabhiraman, Fremont, CA (US); Ashwani Wason, San Jose, CA (US); Vishal Biyani, Pune (IN)

(73) Assignee: OPENGOV, INC., Redwood City, CA (US)

( * ) Notice: Subject to any disclaimer, the term of this patent is extended or adjusted under 35 U.S.C. 154(b) by 20 days.

(21) Appl. No.: 17/180,431

(22) Filed: Feb. 19, 2021

(65) Prior Publication Data
US 2022/0269582 A1 Aug. 25, 2022

(51) Int. Cl.
*G06F 11/36* (2006.01)
*G06F 8/65* (2018.01)

(52) U.S. Cl.
CPC .......... *G06F 11/3664* (2013.01); *G06F 8/65* (2013.01)

(58) Field of Classification Search
USPC ........................................................ 717/124
See application file for complete search history.

(56) References Cited

U.S. PATENT DOCUMENTS

| | | | |
|---|---|---|---|
| 2015/0370674 A1* | 12/2015 | Lazar | G06Q 30/0207 705/14.1 |
| 2018/0336123 A1* | 11/2018 | Benes | G06F 11/3688 |
| 2019/0235993 A1* | 8/2019 | Modeel | G06F 8/60 |
| 2019/0294531 A1* | 9/2019 | Avisror | G06F 11/3664 |
| 2019/0340108 A1* | 11/2019 | Yabusaki | G06F 11/3692 |
| 2020/0348921 A1* | 11/2020 | Maréchal | G06F 8/65 |
| 2021/0042207 A1* | 2/2021 | Joyce | G06F 21/53 |
| 2021/0279047 A1* | 9/2021 | McLaren | G06F 11/3664 |
| 2021/0389938 A1* | 12/2021 | Kulkarni | G06Q 30/06 |

OTHER PUBLICATIONS

S. Ma et al.; "Using Service Dependency Graph to Analyze and Test Microservices"; IEEE 42nd Annual Computer Software and Applications Conference (COMPSAC), pp. 81-86; 2018 (Year: 2018).*

(Continued)

*Primary Examiner* — Wei Y Zhen
*Assistant Examiner* — Clint Thatcher
(74) *Attorney, Agent, or Firm* — Patterson + Sheridan, LLP

(57) ABSTRACT

The present disclosure provides techniques for configuring and provisioning a tenant for testing microservices in a multi-tenant instance. Code is committed for a modified microservice, and a configuration is received for a production tenant of the multi-tenant instance. The configuration is updated to include a reference to the updated microservice, and then provided to a provisioner that provisions a test tenant based on the configuration. The microservices for the test tenant are compared with versions in a code version management system and updated, then a reference to the test tenant is provided to a developer to test the modified microservice. The test tenant may be deprovisioned after a predetermined amount of time, by a command of the developer, or other automated method.

17 Claims, 4 Drawing Sheets

(56) References Cited

OTHER PUBLICATIONS

Andy Patrizio; "What is Multi-Tenant Architecture?"; Datamation.com website [full URL in ref.]; Feb. 12, 2021 (Year: 2021).*
Nabil Hijazi; "Dependency Hell in Microservices and How to Avoid It"; LinkedIn.com website [full URL in ref.]; 2016 (Year: 2016).*
Minikube. (n.d.). https://minikube.sigs.k8s.io, Update releases.json to include v1.21.0 (ed6576118), 1 page.
Article entitled "Lightweight Kubernetes," https://k3s.io/, accessed Jun. 8, 2021, 2 pages.
Article entitled Skaffold, https://skaffold.dev/, May 20, 2021, 3 pages.
GitHub, "GoogleContainerTools/kaniko," https://protect-us.mimecast.com/s/WttiCM8Km2sYAmBHQZ7LG?domain=github.com, accessed Jun. 8, 2021, 24 pages.
Overview of Docker Compose, https://protect-us.mimecast.com/s/Dx2oCNkKn2HpGykc0k08o?domain=docs.docker.com, May 20, 2021, 5 pages.
GitHub, telepresenceio/telepresence, https://protect-us.mimecast.com/s/w1loCOYXo2ckyQ1iAkgKI?domain=github.com, 2 pages.
Tilt, https://tilt.dev/, accessed May 20, 2021, 7 pages.
GitHub, ksync/ksync, https://github.com/ksync/ksync <https://protect-us.mimecast.com/s/MZnoCQWKq2fLyZvhGhF3-?domain=github.com>, 4 pages.
Welcome to Operator Framework, "OperatorFramework," https://protect-us.mimecast.com/s/ts2bCR6Kr0IXzZ4tWs7z6?domain=operatorframework.io, accessed May 20, 2021, 3 pages.
Spinnaker, "Cloud Native Continuous Delivery", https://protect-us.mimecast.com/s/u-rOCVO2yki8RQqTxEk0d?domain=spinnaker.io, accessed May 20, 2021, 3 pages.
GitHub, "garden-io/garden", https://protect-us.mimecast.com/s/F9TUCW6KzII8WorTzLoSe?domain=github.com, 5 pages.
Jenkins, https://protect-us.mimecast.com/s/0iChCXDXA0cZzrEhLZms3?domain=jenkins.io, accessed Jun. 10, 2021, 2 pages.
Brian McGehee, "Introducing Puppet Pipelines™ and Puppet® Container Registry," https://protect-us.mimecast.com/s/YMFkCZ6GDoIYpBKHQZHK2?domain=puppet.com, Oct. 5, 2017, 4 pages.
Release, "How To: Get a Free Minecraft Server Running on Release," accessed Jun. 11, 2021, https://blog.releaseapp.io/blog/free-minecraft-server-running-on-releaseapp-io, 4 pages.
Mesh Dynamics, "Test and debug microservices APIs," accessed Jun. 11, 2021, https://www.meshdynamics.io/, 1 page.
GitHub, "Azure/draft," accessed Jun. 8, 2021, https://github.com/Azure/draft, 2 pages.
Github, "datawire/forge," accessed Jun. 8, 2021, https://github.com/datawire/forge, 1 page.
Github, "hasura/gitkube," accessed Jun. 8, 2021, https://github.com/hasura/gitkube, 3 pages.

* cited by examiner

METHOD AND SYSTEM FOR SYNCHRONOUS DEVELOPMENT AND TESTING OF LIVE, MULTI-TENANT MICROSERVICES BASED SAAS SYSTEMS

INTRODUCTION

Aspects of the present disclosure relate to testing microservices in a distributed computing environment, and more particularly to creating a tenant for testing microservices in a multi-tenant environment.

For microservices based systems, deferring testing of microservices until deployment in production increases risks of rework and may cause issues affecting production. To mitigate these risks, some developers test new or updated microservices on local computers, simulating or emulating a dynamic cloud-based environment, in which the production application typically runs. However, simulating the distributed computer system on a local machine has a number of shortcomings. Because the behavior and functionality of the microservice under test is more reflective of the test environment (e.g., a single local computer, emulated/simulated cloud-based environment, or the like), a test environment that simulates or emulates a production environment may be an unreliable way to test a new or updated microservice for production.

Another approach utilized by developers is to provision a static cloud environment. However, this approach may be cost prohibitive due to resource requirements to run a microservice-based application, or may become counterproductive as multiple developer teams are unable to effectively share time on the static system as workloads grow.

Another approach is to commit updated microservices code to a version control system branch, and rely on continuous integration systems to surface issues with the updated code. However, this approach requires other developers using the version control system to rely on code that has not been fully tested, which may further impact overall developer productivity, release quality, and overall cost of development.

What is needed are systems and methods to overcome the shortcomings of conventional approaches.

BRIEF SUMMARY

Certain embodiments provide techniques for configuring and provisioning a tenant for testing microservices in a multi-tenant instance. Code is committed for one or more modified microservices, and a configuration is received for a test tenant of the multi-tenant instance. The configuration is updated to include a reference to the updated microservice, and then provided to a provisioner that provisions a test tenant based on the configuration. The microservices for the test tenant are compared with versions in a code version management system and updated, then a reference to the test tenant is provided to test the modified microservice. The test tenant may be de-provisioned after a predetermined amount of time, by a command of the developer, or by other automated means.

In one embodiment, a method for creating a tenant in a multi-tenant environment is disclosed. The method includes receiving a test microservice, comprising an updated or otherwise modified version of a microservice to be tested, receiving a plurality of microservices from a production artifacts repository, wherein the plurality of microservices includes the microservice. The method further includes generating a test environment configuration based on the production artifacts repository, wherein the test environment configuration comprises a set of test tenant microservices including at least the test microservice and one or more microservices of the plurality of microservices having a dependency relationship with the test microservice, provisioning a test tenant based on the test environment configuration in an instance, and deploying the set of test tenant microservices in the test tenant.

In another embodiment, a system for creating a tenant in a multi-tenant environment is disclosed. The system includes one or more memories comprising computer-executable instructions, one or more processors coupled to the one or more memories configured to execute the computer-executable instructions and cause the system to perform a method for creating a tenant in a multi-tenant environment. In certain embodiments, the method includes receiving a test microservice, comprising a modified version of a microservice, receiving a plurality of microservices from a production artifacts repository, wherein the plurality of microservices includes the microservice, and generating a test environment configuration based on the production artifacts repository, wherein the test environment configuration comprises a set of test tenant microservices including at least the test microservice and one or more microservices of the plurality of microservices having a dependency relationship with the test microservice. The method further includes provisioning a test tenant based on the test environment configuration in an instance, and deploying the set of test tenant microservices in the test tenant.

In another embodiment, a computer-readable medium comprising computer-readable instructions for executing a method for creating a tenant in a multi-tenant environment is disclosed. In this embodiment the method includes receiving a test microservice, comprising a modified version of a microservice, receiving a plurality of microservices from a production artifacts repository, wherein the plurality of microservices includes the microservice, and generating a test environment configuration based on the production artifacts repository, wherein the test environment configuration comprises a set of test tenant microservices including at least the test microservice and one or more microservices of the plurality of microservices having a dependency relationship with the test microservice. The method may further include provisioning a test tenant based on the test environment configuration in an instance, and deploying the set of test tenant microservices in the test tenant.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
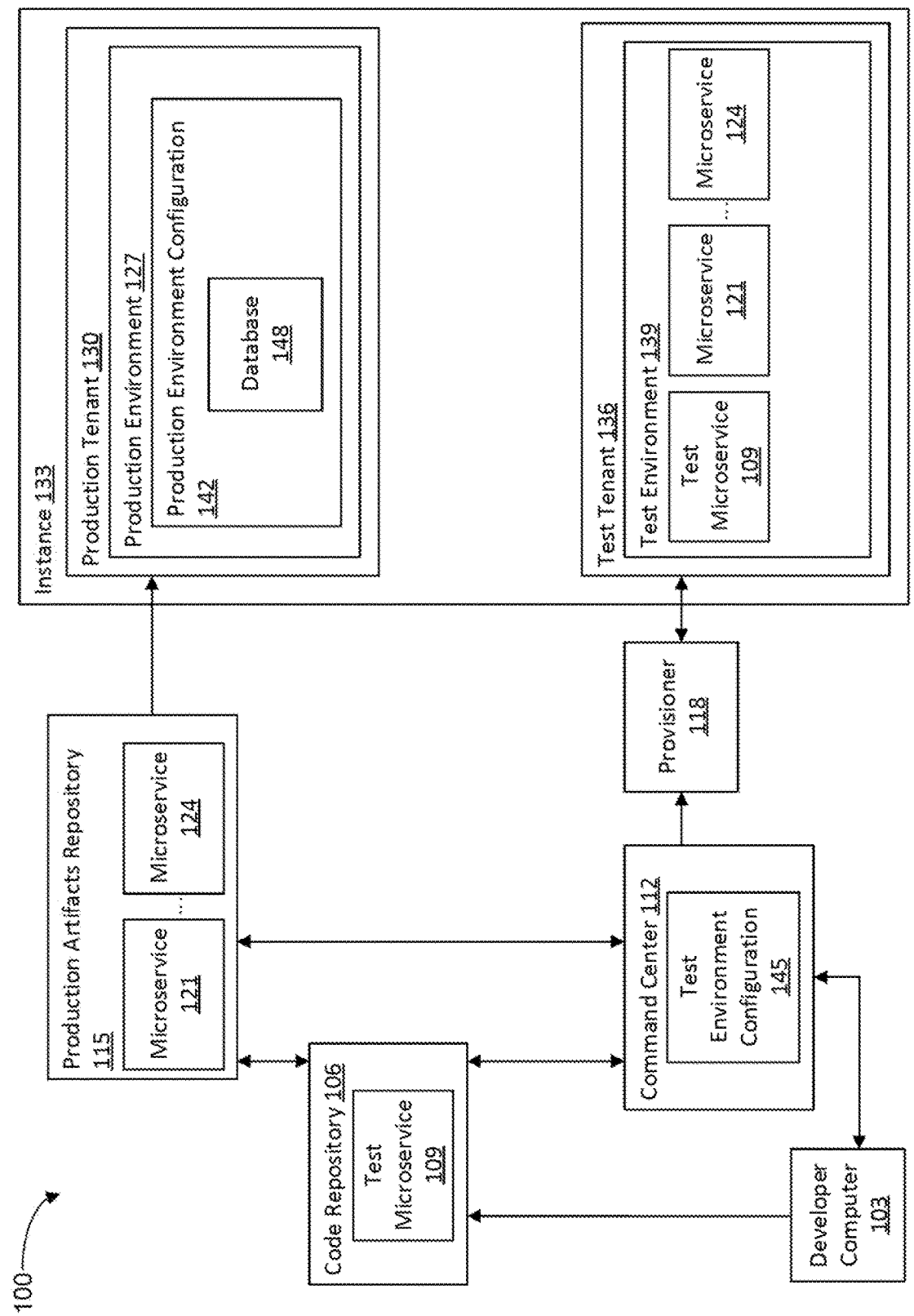
FIG. 1 depicts a system for synchronous development and testing of a live, multi-tenant microservice, according to certain embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure provide apparatuses, methods, processing systems, and computer-readable mediums for configuring and provisioning a tenant for testing microservices in a multi-tenant instance.

Methods and systems disclosed herein relate to synchronous testing of microservices in a multi-tenant software as a service ("SaaS") cloud computing environment.

A cloud computing environment in this context may be a distributed computing environment containing compute resources such as processors (CPU's), memory, storage, load balancing, and other compute resources. SaaS is a capability provided to a developer, to provide the developers applications on a cloud computing environment. As such, these applications are accessible from various client devices through a web browser interface, a dedicated program interface, or a combination of these. A user of such an application does not manage or control the underlying cloud computing environment, or even individual application capabilities (although the developer does have at least some control over these), with the exception of user specific application configuration settings.

Within a SaaS cloud computing environment, an instance is a context created based on a computer architecture desired by an organization, defining available resources and organization of those resources based on the computer architecture. Within an instance one or more tenants may be defined, resourced, and then deployed, for example, to host a SaaS application. As used herein, a multi-tenant instance or a multi-tenant environment refers to an instance comprising more than one tenant. By having multiple tenants within an instance, efficient use of resources allocated to the instance may be realized.

A "microservice" in this context is code providing a defined service (or in some cases, more than one service) required by an application, typically in the context of a microservices architecture that orchestrates a number of microservices to provide an application to a user. By developing an application as a collection of microservices, each microservice becomes a separable module that may be individually developed. This modular aspect of a microservice enables developers to update and revise an individual microservice while providing the application to a consumer, replacing the older version of the microservice with the newer version upon completion of development. As such, the ability to test a microservice under development in the same multi-tenant environment as the production application enables realistic testing not afforded by conventional approaches, under the stresses experienced by production. This enables avoiding rework seen in conventional approaches that seek to simulate or emulate a production environment on a single computer.

As is understood by one of ordinary skill in the art, one or more tenants of a cloud computing platform may be deployed in an instance. An application is typically deployed in such a tenant, as compute resources available to the application may be scaled up or down depending upon performance requirements, efficient use of resources, cost of resources, and the like. A production environment in a tenant (also called a "production tenant" herein) is an application environment provisioned for use by a consumer of the application, typically provided with sufficient resources to provide a good user experience (fast, responsive, available, etc.). All code, such as microservices code, in the production environment should be thoroughly tested prior to deployment to ensure optimal performance and user experience.

However, many developers test their code by emulating or simulating the production environment, as the time and resources needed to stand up a cloud service tenant may not be justifiable given the time needed to test their code. Moreover, many companies are hesitant to have developers stand up additional tenants in an instance hosting a production tenant due to cost and concerns around an improperly configured additional tenant negatively impacting the performance of the production tenant. As a result, many developers emulate the production environment on a local computer, which limits the effectiveness of testing of code. A production environment hosted on a tenant in a multi-tenant environment is typically required to share resources with other tenants, in addition to the stress placed on the production environment due to use of the hosted application, its microservices, databases, etc. A local computer emulating a production environment is not subject to the rigors of a multi-tenant environment or commercial use of the hosted application. For these reasons, and others, a local computer is a less than optimal proxy for testing a microservice destined for use in a multi-tenant production environment.

To overcome these and other shortcomings of prior approaches, methods and systems described herein provide a test environment configured as a "light" version of the production environment, within a tenant simultaneously with the production tenant in the same instance, and removing the test environment after a predetermined amount of time.

In one embodiment a developer commits code, such as code for a test microservice, to a feature branch within a code repository. The test microservice may be a modified version of a microservice existing in a production environment, or a new microservice not yet running in production. In some embodiments, an integration system, also called a "command center" herein, obtains a baseline version of the production system code from a production artifacts repository to develop a test tenant configuration, as well as configuration artifacts of the production environment, such as databases (and corresponding data), file storage, message bus, security policies, load balancing, and the like.

In some embodiments, the command center then retrieves the test microservice from the code repository, replacing the corresponding microservice from the production artifacts with the test microservice in a test configuration, or in the case of a new microservice adding the test microservice to the test configuration. To create the "light" version of the production environment, to minimize resources used by a tenant configured with the test configuration, microservices are kept in the configuration only to the extent there is a dependency relationship with the test microservice. In this context, a dependency relationship between microservices (or other components of an application such as databases) is one in which a first microservice makes a call to a second microservice; there may be a further dependency if the second microservice makes a call to a third microservice, etc. In some embodiments, a dependency graph may be developed to map out dependency relationships between different microservices, to determine which will be needed to test the test microservice. Microservices not in a dependency relationship with the test microservice are not included in the test configuration. Moreover, the command center additionally modifies the database artifact of the configuration to only include databases, and corresponding data, needed to test the test microservice.

Once a test configuration is developed by the command center, it is provided to a provisioner that provisions (i.e., allocates compute resources based on the test configuration) a test tenant in the instance. Once the test tenant is provisioned, the provisioner deploys the microservices, databases, etc. to the test tenant. Once deployed, the provisioner then updates the deployed microservices and databases, and finalizes the test configuration, such as by seeding the database with test data, based on the most recent associated branch under test of the code repository.

Once the updates are complete, a link, or other reference is provided to the developer to enable access to the test environment. Code tests, design tests, code validation, and other tests that may be needed to fully test the test microservice may now be performed by the developer. As the test tenant may be resident on the same instance as the production tenant, and operates under the same policy, resource configuration, load balancing configuration, and other configurations, the testing of the test microservice is highly correlated to the production environment, giving the developer confidence that once testing is complete, the test microservice may be ready to deploy to the production environment. In cases where the test tenant is in a different instance than the production tenant, it operates under the same or similar policies, resource configurations, load balancing configurations, and other configurations as the production tenant, to correlate the test tenant environment to the production tenant environment.

After a predetermined amount of time, or at the command of the developer, the test tenant and test environment are automatically deprovisioned after completion of testing, and removed from the instance.

Example System for Synchronous Development and Testing

FIG. 1 depicts an embodiment of a system 100 for synchronous development and testing of live, multi-tenant microservice.

A developer computer 103 is generally a computer system used by a developer of code, which may be tested according to the method described herein. Developer computer 103 may be any type of computer suitable for code development, including a laptop, desktop, tablet, phone, or other personal computing devices. In some embodiments, developer computer 103 may be a remote computer system or a distributed computer system such as a cloud platform. Developer computer 103 is coupled to a code repository 106, which may be a source code management and version control system. A user of developer computer 103 may store a test microservice 109 on code repository 106. Although one test microservice 109 is discussed, one of skill in the art will appreciate that test microservice 109 may be representative of a plurality of test microservices, and as discussed below. Moreover, in certain embodiments code repository 106 may include additional microservices that are awaiting test, including microservices that have already been tested and are ready to be deployed into a production instance.

Developer computer 103 may be further coupled to a command center 112. Command center 112 is further coupled to a production artifacts repository 115 and a provisioner 118. In certain embodiments, code repository 106 and production artifacts repository 115 may be the same repository, and additional repositories may be added. In some embodiments, code repository 106 and or production artifacts repository 115 may be comprised of multiple repositories, up to one per service/microservice.

In embodiments, the command center 112 is configured to retrieve one or more production artifacts related to a production environment 127. A production artifact in this context may include deployable code for microservices to be executed in the production environment. The production environment 127 is deployed in a production tenant 130 that is, in turn, deployed in an instance 133. The command center retrieves microservices from the production artifacts repository 115 or code repository 106, such as microservice 121 through microservice 124, which may be any number of microservices utilized within the production environment 127, as discussed below. In some embodiments, one or more of microservice 121 through microservice 124 may be candidate microservices that have been tested and/or accepted, but are not currently deployed in the production environment 127 Command center 112 is further configured to generate a test environment configuration 145 for a test tenant 136 based on the elements of production artifacts repository 115 and a production environment configuration 142 of the production environment 127.

As part of generating the test environment configuration 145, command center 112 incorporates test microservice 109 into the production artifacts 115 and microservices retrieved from code repository 106 or production artifacts repository 115. In embodiments where test microservice 109 is a modified version of one (or more) of microservices 121-124, for example, microservice 121, command center 112 will substitute test microservice 109 for microservice 121 in the test environment configuration 145. In embodiments where test microservice 109 is a new microservice, it will be deployed with the retrieved microservices within the test environment configuration 145.

In embodiments, the command center 112 will further incorporate the production environment configuration 142 into the test environment configuration 145, including such elements as a database 148 (and related data), file storage, message bus, compute resources, security policies, and load balancer specifications.

Elements of the production artifacts repository 115, production environment configuration 142, and code repository 106 are incorporated into the test environment configuration 145, and represent an working copy of the configuration of the production environment 127 in addition to the test microservice 109.

In some embodiments, a more resource-efficient, or "light" configuration for the test environment 139 may be desired in order to optimize resource allocation and use of the test tenant 136. In such embodiments, the command center 112 is configured to omit microservices provided by the production artifacts repository 115 or code repository 106 that are not needed to test the test microservice 109. Similarly, for database 148, not all data may be required. To determine what microservices and data (in the context of database 148) are needed to test the test microservice 109, a dependency graph may be generated to indicate which microservices and data are needed.

In some embodiments, there is no modified or updated test microservice 109, in which case, the test environment configuration 145 is a copy of the then-current production environment 127, enabling a developer to test various aspects of that environment in the multi-tenant environment of the instance 133.

In the depicted embodiment, command center 112 is coupled to provisioner 118. Provisioner 118 receives the test environment configuration 145 to provision test tenant 136 to instantiate test environment 139 based on the test environment configuration 145. Once test tenant 136 is provisioned, test tenant 136 is deployed, which includes the test microservice 109 as well as other microservices of microservices 121 through microservice 124, databases, and other elements defined in the test environment configuration 145. Ultimately, which ones of microservice 121 through microservice 124 are deployed in test environment 139 depends on the nature of test microservice 109 and the dependency relationship between test service 109 and microservice 121 through microservice 124, as discussed above. In some embodiments, test microservice 109 is a new microservice and does not replace any one of microservice 121 through microservice 124, while in other embodiments microservice 109 is a modified version of one of microservice 121 through microservice 124. In these embodiments, test microservice 109 would replace the microservice 121 through microservice 124 as an updated version of the replaced microservice.

Once deployment is complete, provisioner 118 accesses code repository 106 (or another code repository) to check for updates to the main branch of each artifact and database of the production environment 127. If an update is detected, this update may be provided to the appropriate element of the test environment 139. Once the update is complete, if needed at all, provisioner 118 indicates that the test environment 139 is ready for use to the command center 112, which in turn provides a link, or other reference, to the developer computer 103, to enable the developer to access the test environment 139 and work with test microservice 109.

In some embodiments, upon deployment of the test environment 139, an expiration time and date will be set at the provisioner 118. The test environment 139 will poll the provisioner 118 for the expiration time and date, and the provisioner 118 will automatically deprovision the test tenant 136 at expiration. Alternatively, the developer may issue a destroy command at the developer computer, which will be provided to the command center 112, and which will trigger a command to the provisioner 118 to deprovision the test tenant 136. Once the test tenant 136 is deprovisioned, the command center 112 publishes infrastructure deprovisioning information to the developer computer 103.

Example Method for Synchronous Development and Testing

Figure 2:
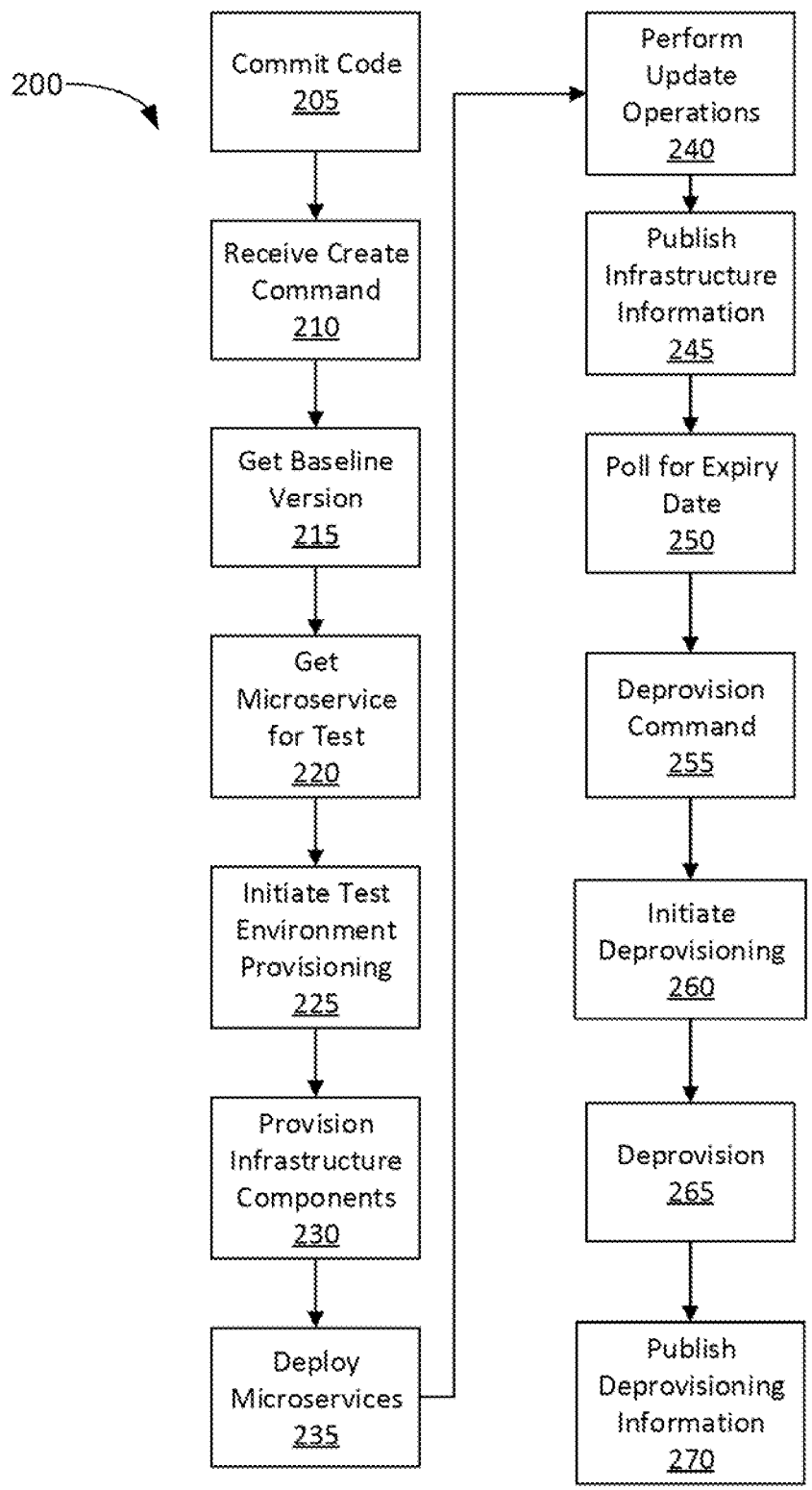
FIG. 2 depicts a method for synchronous development and testing of a live, multi-tenant microservice, according to certain embodiments.

FIG. 2 depicts an example method 200 for synchronous development and testing of live, multi-tenant microservice using system 100 of FIG. 1.

At 205, a developer commits code for a test microservice 109 at the developer computer 103 to a feature branch of code repository 106.

Then, at 210, a developer sends a create command to command center 112. The create command issued at 210 initiates the process of provisioning and deploying a test tenant 136. In some embodiments, the test tenant 136 comprises a test environment 139, in a multi-tenant instance, in an environment similar to, or the same as, a production environment 127, within the same instance as the test tenant 136.

At 215, the command center 112 retrieves a baseline version of the production environment 127, which may include receiving one or more microservices 121 through microservice 124 from a production artifacts repository 115 or a code repository 106, and obtains a production environment configuration 142 from the production environment 127.

At 220 the command center 112 receives the test microservice 109 from the code repository 106. In embodiments, the test microservice 109 is a modified version of one of the microservices 121-124, for example, microservice 121, while in other embodiments test microservice 109 is a new microservice. In the event that microservice 109 is an updated version of, for example microservice 121, then command center 112 generates a test environment configuration 145, test microservice 109 and removing microservice 121.

In certain embodiments, one or more microservices, other than the test microservice 109, may be candidate microservices not yet currently in production. One or more of such candidate microservices may have been previously tested and accepted. Command center 112 further incorporates elements of the production environment configuration 142, such as database 148, into the test environment configuration 145. Command center 112, in some embodiments, reduces the number of additional microservices included in the test environment configuration 145, by removing any microservices not needed to test the test microservice 109. Additionally, in some embodiments, only data of database 148 needed to test the test microservice 109 will be kept as part of test environment configuration.

At 225, the command center 112 initiates test environment 139 provisioning by providing the test environment configuration 145 to a provisioner 118.

At 230, using the test configuration 145, the provisioner 118 creates and provisions infrastructure components of the test tenant 136, and deploys the test environment 139, in the instance 133, that also contains the production tenant 130.

Once test tenant 136 has been provisioned, at 235, provisioner 118 deploys microservices and databases in accordance with the test environment configuration 145.

Once deployed, at 240, the microservices and databases are updated to the latest versions present in a production main branch of the code repository, upon which the production environment 127 is based. As noted above, the test microservice 109, that was used instead of microservice 121 of the production artifacts repository 115 or code repository 106, may not need to be modified in the update operation.

Upon completion of the update operations, at 245 infrastructure information of the test environment 139 is published to the developer computer by the command center 112. A reference to the test environment 139, such as a hyperlink, is provided to the developer computer by the command center 112 to enable developer access to the test environment 139.

Also upon completion of update operations, at 250, an expiration date/time for the production environment 139 may be set by the provisioner 118. The expiration is polled by the provisioner 118.

Upon reaching the expiration date/time, or upon receiving a command to deprovision from developer computer 103, at 255 a deprovision command is received at the provisioner 118. At 260 the provisioner 118 initiates deprovisioning.

At 265, the test tenant 126 has been automatically deprovisioned after testing, and at 270 the deprovisioning information is published to the developer computer 103 by the command center 112.

Example Method for Synchronous Development and Testing

Figure 3:
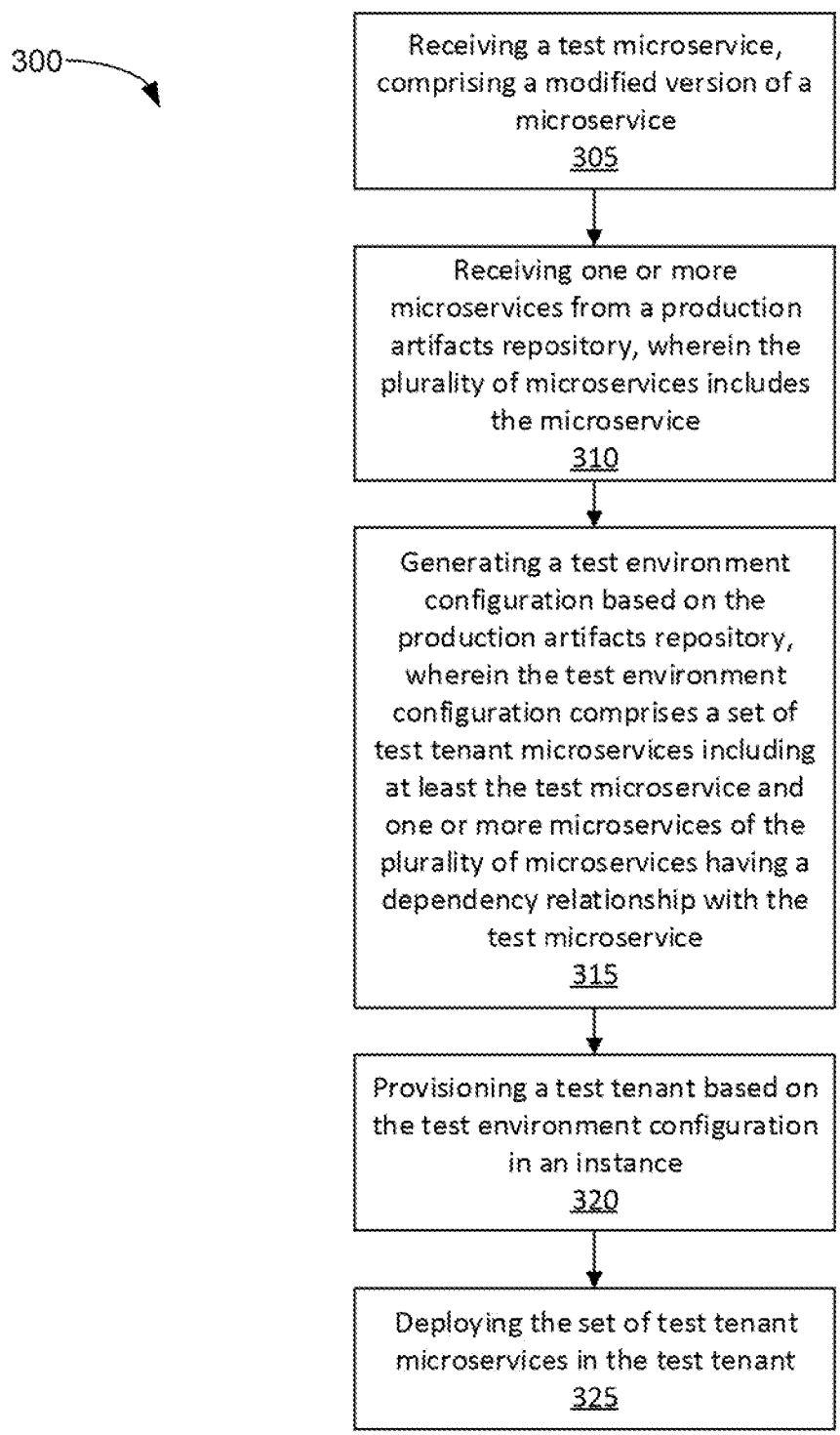
FIG. 3 depicts a method for synchronous development and testing of a live, multi-tenant microservice, according to certain embodiments.

FIG. 3 depicts an example method 300 for synchronous development and testing of live, multi-tenant microservice.

At 305, a test microservice is received, the test microservice including a modified version of a microservice or a new microservice.

At 310, one or more microservices are received from a production artifacts repository, wherein the plurality of microservices include the microservice.

At 315, a test environment configuration is generated based on the production artifacts repository. In some embodiments, the test environment configuration comprises a set of test tenant microservices including at least the test microservice and one or more microservices of the plurality of microservices having a dependency relationship with the test microservice.

At 320, a test tenant is provisioned based on the test environment configuration in an instance. In some embodiments, the instance may further include a production tenant configured based on the production artifacts repository. In some embodiments, the instance may be hosted on a distributed computing platform, such as a cloud platform or other distributed computing system, while in other embodiments, the instance may be hosted on a server.

At 325, the set of test tenant microservices is deployed in the test tenant.

In some embodiments, the method 300 further includes updating one or more test tenant microservices in the set of test tenant microservices based on determining a difference between each of the one or more test tenant microservices and a code repository comprising source code for each of the one or more test tenant microservices. In such embodiments, the method 300 may further include creating a dependency graph indicating a dependency relationship between each respective microservice of the plurality of microservices and the test microservice.

In some embodiments, method 300 may further include receiving a database from a production tenant configuration. In some embodiments, the test tenant configuration comprises a copy of the database comprising a subset of data from the database, based on one or more dependency relationships associated with the test tenant microservices.

In some embodiments, the method 300 may further include deleting the test tenant based on one or more of a predetermined amount of time and a user command.

Example System for Synchronous Development and Testing

Figure 4:
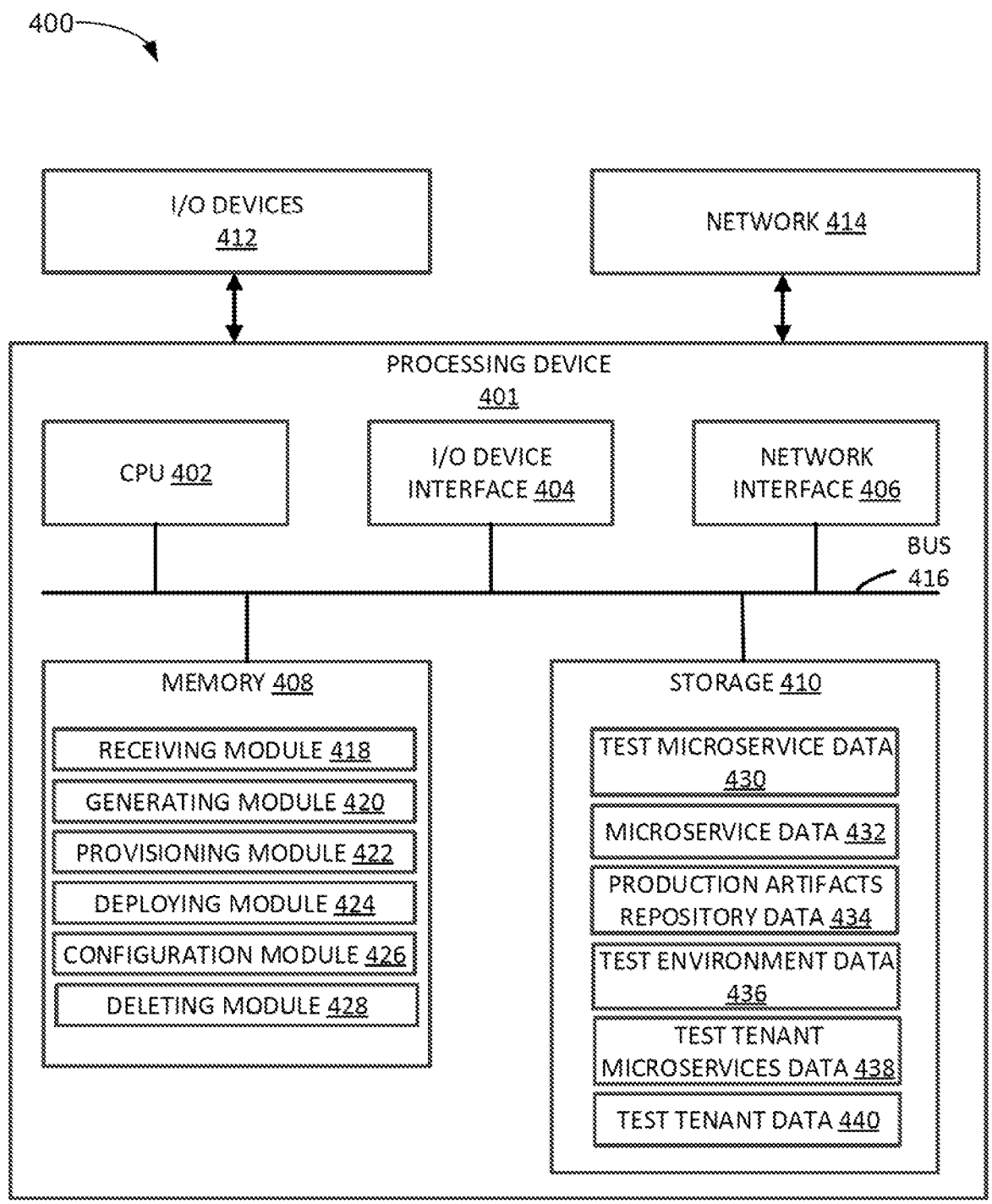
FIG. 4 depicts a system for synchronous development and testing of a live, multi-tenant microservice, according to certain embodiments.

FIG. 4 depicts a system 400 for synchronous development and testing of live, multi-tenant microservice, according to disclosed embodiments, such as methods and systems described with respect to FIGS. 1-3.

System 400 includes a processing device 401 that includes a central processing unit (CPU) 402 connected to a data bus 416. CPU 402 is configured to process computer-executable instructions, e.g., stored in memory 408 or storage 410, and to cause the processing device 401 to perform methods described herein, for example with respect to FIGS. 1-3. CPU 402 is included to be representative of a single CPU, multiple CPUs, a single CPU having multiple processing cores, and other forms of processing architecture capable of executing computer-executable instructions.

System 400 further includes input/output (I/O) device(s) 412 and interfaces 404, which allows processing device 401 to interface with input/output devices 412, such as, for example, keyboards, displays, mouse devices, pen input, other computers, and other devices that allow for interaction with processing device 401. Note that system 400 may connect with external I/O devices through physical and wireless connections (e.g., an external display device).

System 400 further includes a network interface 406, which provides processing device 401 with access to external network 414 and thereby external computing devices.

Processing device 401 further includes memory 408, which in this example includes a receiving module 418, generating module 420, provisioning module 422, deploying module 424, configuration module 426, and deleting module 428 for performing operations described in FIGS. 1-3.

Note that while shown as a single memory 408 in FIG. 4 for simplicity, the various aspects stored in memory 408 may be stored in different physical memories, including memories remote from system 400, but all accessible by CPU 402 via internal data connections such as network interface 406 and bus 416.

Storage 410 further includes test microservice data 430, data comprising a test microservice such as test microservice 109, which may be like test microservice as described in FIGS. 1-3; microservice data 432, data comprising a microservice such as microservice 121 through microservice 124, which may be like microservice(s) described in FIGS. 1-3; production artifacts repository data 434, that may be like production artifacts repository described in FIGS. 1-3; test environment data 436, that may be like test environment as described in FIGS. 1-3; test tenant microservices data 438, that may be like test tenant microservices described in FIGS. 1-3; and test tenant data 440, that may be like test tenant described in FIGS. 1-3.

While not depicted in FIG. 4, other aspects may be included in storage 410.

As with memory 408, a single storage 410 is depicted in FIG. 4 for simplicity, but various aspects stored in storage 410 may be stored in different physical storages, but all accessible to CPU 402 via internal data connections, such as bus 416, or external connection, such as network interfaces 406. One of skill in the art will appreciate that one or more elements of system 400 may be located remotely and accessed via network 414.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for creating a tenant in a multi-tenant environment, comprising:
    receiving a test microservice, comprising a modified version of a microservice;
    receiving a plurality of microservices from a production artifacts repository, wherein the plurality of microservices includes the test microservice;
    generating a dependency graph that maps out dependency relationships among the plurality of microservices, wherein a dependency relationship exists between a first microservice and a second microservice if the first microservice calls the second microservice or the second microservice calls the first microservice;
    generating a test environment configuration based on the production artifacts repository;
    including, in the test environment configuration, based on the dependency graph, a set of test tenant microservices comprising at least the test microservice and one or more microservices of the plurality of microservices that the dependency graph indicates to have a dependency relationship with the test microservice;
    omitting, from the test environment configuration, based on the dependency graph, microservices of the plurality of microservices that the dependency graph indicates not to have any dependency relationship with the test microservice;
    provisioning a test tenant based on the test environment configuration in an instance; and
    deploying the set of test tenant microservices in the test tenant.

2. The method of claim 1, further comprising updating one or more test tenant microservices in the set of test tenant microservices based on determining a difference between each of the one or more test tenant microservices and a code repository comprising source code for each of the one or more test tenant microservices.

3. The method of claim 1, wherein the instance further comprises a production tenant configured based on the production artifacts repository.

4. The method of claim 1, further comprising receiving a database from a production tenant configuration, wherein the test environment configuration comprises a copy of the database comprising a subset of data from the database, based on one or more dependency relationships associated with the set of test tenant microservices.

5. The method of claim 1, further comprising deleting the test tenant based on one or more of a predetermined amount of time and a user command.

6. The method of claim 5, wherein the instance is hosted on a distributed computing environment.

7. A system for creating a tenant in a multi-tenant environment comprising:
one or more memories comprising computer-executable instructions;
one or more processors coupled to the one or more memories configured to execute the computer-executable instructions and cause the system to perform a method for creating a tenant in a multi-tenant environment, the method comprising:
receive a test microservice, comprising a modified version of a microservice;
receive a plurality of microservices from a production artifacts repository, wherein the plurality of microservices includes the test microservice;
generate a dependency graph that maps out dependency relationships among the plurality of microservices, wherein a dependency relationship exists between a first microservice and a second microservice if the first microservice calls the second microservice or the second microservice calls the first microservice;
generate a test environment configuration based on the production artifacts repository;
include, in the test environment configuration, based on the dependency graph, a set of test tenant microservices comprising at least the test microservice and one or more microservices of the plurality of microservices that the dependency graph indicates to have a dependency relationship with the test microservice;
omit, from the test environment configuration, based on the dependency graph, microservices of the plurality of microservices that the dependency graph indicates not to have any dependency relationship with the test microservice;
provision a test tenant based on the test environment configuration in an instance; and
deploy the set of test tenant microservices in the test tenant.

8. The system of claim 7, wherein the computer-executable instructions further cause the system to update one or more test tenant microservices in the set of test tenant microservices based on determining a difference between each of the one or more test tenant microservices and a code repository comprising source code for each of the one or more test tenant microservices.

9. The system of claim 7, wherein the instance further comprises a production tenant configured based on the production artifacts repository.

10. The system of claim 7, wherein the computer-executable instructions further cause the system to receive a database from a production tenant configuration, wherein the test environment configuration comprises a copy of the database comprising a subset of data from the database, based on one or more dependency relationships associated with the set of test tenant microservices.

11. The system of claim 7, wherein the computer-executable instructions further cause the system to delete the test tenant based on one or more of a predetermined amount of time and a user command.

12. The system of claim 11, wherein the instance is hosted on a distributed computing environment.

13. A non-transitory computer-readable medium comprising computer-readable instructions for executing a method for creating a tenant in a multi-tenant environment, the method comprising:
receive a test microservice, comprising a modified version of a microservice;
receive a plurality of microservices from a production artifacts repository, wherein the plurality of microservices includes the test microservice;
generate a dependency graph that maps out dependency relationships among the plurality of microservices, wherein a dependency relationship exists between a first microservice and a second microservice if the first microservice calls the second microservice or the second microservice calls the first microservice;
generate a test environment configuration based on the production artifacts repository;
include, in the test environment configuration, based on the dependency graph, a set of test tenant microservices comprising at least the test microservice and one or more microservices of the plurality of microservices that the dependency graph indicates to have a dependency relationship with the test microservice;
omit, from the test environment configuration, based on the dependency graph, microservices of the plurality of microservices that the dependency indicates not to have any dependency relationship with the test microservice;
provision a test tenant based on the test environment configuration in an instance; and
deploy the set of test tenant microservices in the test tenant.

14. The non-transitory computer-readable medium of claim 13, the method further comprising update one or more test tenant microservices in the set of test tenant microservices based on determining a difference between each of the one or more test tenant microservices and a code repository comprising source code for each of the one or more test tenant microservices.

15. The non-transitory computer-readable medium of claim 13, wherein the instance further comprises a production tenant configured based on the production artifacts repository.

16. The non-transitory computer-readable medium of claim 13, the method further comprising receive a database from a production tenant configuration, wherein the test environment configuration comprises a copy of the database comprising a subset of data from the database, based on one or more dependency relationships associated with the set of test tenant microservices.

17. The non-transitory computer-readable medium of claim 13, the method further comprising delete the test tenant based on one or more of a predetermined amount of time and a user command.

* * * * *